United States Patent
Tomotake et al.

(10) Patent No.: US 6,746,115 B2
(45) Date of Patent: Jun. 8, 2004

(54) INK-JET IMAGE RECORDING METHOD

(75) Inventors: Atsushi Tomotake, Hino (JP); Hidetaka Ninomiya, Hino (JP); Masaki Nakamura, Akiruno (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 10/365,936

(22) Filed: Feb. 13, 2003

(65) Prior Publication Data

US 2003/0169320 A1 Sep. 11, 2003

(30) Foreign Application Priority Data

Feb. 21, 2002 (JP) ........................................ 2002-044443

(51) Int. Cl.$^7$ ............................. G01D 11/00; B41J 2/01
(52) U.S. Cl. ........................................ 347/100; 347/101
(58) Field of Search ................................. 347/100, 101

(56) References Cited

U.S. PATENT DOCUMENTS

2003/0107631 A1 * 6/2003 Goto et al. ................. 347/100

* cited by examiner

*Primary Examiner*—Michael S. Brooke
(74) *Attorney, Agent, or Firm*—Muserlian, Lucas and Mercanti

(57) ABSTRACT

An ink-jet image recording method is disclosed. In the method an aqueous ink containing a colored particles comprising a colorant and a resin is employed, and following Formula 1 is satisfied;

$$15 \leq w \leq 150 \qquad \text{Formula 1}$$

wherein, w is a parameter expressed by following Formula 2;

$$w=[(dm+ds)/\{(NV \times vd)/r^3\}] \times 10{,}000 \qquad \text{Formula 2}$$

wherein, ds is a recording density in dpi in a moving direction of the recording medium and dm is a recording density in dpi in a direction perpendicular to the moving direction of the recording medium, NV is the colored particle content in the ink in weight percent, vd is a volume average radius in meter of the colored particles and r is radius in meter of the ink droplet.

11 Claims, 3 Drawing Sheets

INK TANK

INK-JET IMAGE RECORDING METHOD

FIELD OF THE INVENTION

The invention relates to an ink-jet image recording method using an aqueous ink, in detail, an ink-jet image recording method improved in the glossiness, the friction resistively and the smoothness difference between the image area and the non-image area.

BACKGROUND OF THE INVENTION

In the ink-jet recording, fine droplets of an ink are flied by various driving principles to record an image and a character. The ink-jet recording method has merits such as that the high speed, low noise and multi-color recording can be easily attained.

The ink-jet recording using a dye ink is spread accompanied with nearing the image quality to that of silver salt photograph and the lowering of the price according to the recent progress of the technology.

The dye is soluble in a solvent, and the dye molecule forms color in a state of a molecular or a cluster. Accordingly, the absorption spectrum is sharp and the color is highly pure and clear since the surroundings of the molecules are similar to each other. The ink-jet image with high transparent feeling and clear hue can be obtained by the dye ink since granular pattern caused by the presence of particles is not formed and scattered or reflected light is not occurred. Moreover, such the ink is excellent in the friction resistivity since no colorant particle is contained in the ink.

On the other hand, the dye ink has a drawback such as that the color light fastness and the resistively against decolorization are low because the reducing of the number of the molecule directly reflects to the color density when the molecule is decomposed by a reaction such as photo reaction. The degradation of the image quality in the course of storage for a long period is large and technology superior to the silver salt photography form the viewpoint of the storage ability of image is not developed yet.

A pigment ink using a pigment having a high light fastness as the colorant is used for the use requiring an image having high resistively against decolorization. However, the pigment ink is inferior in the color reproducibility to the dye ink since the pigment is in a state of pigment particles.

As above-mentioned, the dye ink is superior in the glossiness, transparency and the friction resistively even though inferior in the light fastness, decolorization and spreading resistively, contrary, the pigment ink is superior in the light fastness, decolorization and spreading resistively glossiness even though inferior in the glossiness, transparency and friction resistively.

As the means for solving the above-mentioned problems of the aqueous ink using the water-soluble dye, addition of fine resin particles such as emulsion and latex has been investigated. Japanese Patent Publication Open to Public Inspection, hereinafter referred to as JP O.P.I. Publication, No. 55-18418 describes a proposal relating to a recording medium for ink-jet recording in which latex defined as "a kind of colloid liquid formed by dispersing a component such as rubber and resin by a emulsifying agent in a state of fine particle in water". As the amount of latex two times or more of the mount of the dye is necessary to improve the light fastness and the spread prevention by the addition of the latex such as that proposed in the publication. Consequently, the stability of the dispersion and the release of the ink are difficultly held and the image equal to that by the silver salt photography in the granularity and the glossiness cannot be obtained yet.

Inks for ink-jet recording containing aqueous dispersion of resin colored by an oil-soluble dye or a hydrophobic dye are proposed for solving the problems of low image density and the low light fastness of the aqueous ink using the water-soluble dye. For example, JP O.P.I. Publication Nos. 55-139471, 58-45272, 3-250069, 8-253720, 8-92513, 8-183920 and 2001-11347 each proposes an ink using emulsion polymerized polymer dyed by the oil-soluble dye or polymer particle in which an oil-soluble dye is dispersed. In such the ink using the colored fine particles, the light fastness improving effect of the ink is reduced and the properties such as the dispersion stability, releasing stability and light fastness are difficultly raised and the image comparable to that of the silver salt photography cannot be obtained when the dye is at the surface or outside of the particle.

JP O.P.I. Publication No. 2001-19880 describes that the density, light fastness and the tone of image can be improved by a chelate dye impregnated colored fine particle. However, such the means is insufficient to obtain an image comparable to that of the silver salt photography. On the other hand, JP O.P.I. Publication No. 2001-139607 proposes a method for improving the blocking of nozzles of the ink-jet head and contact ability by the use of a chelate dye impregnated core/shell type colored fine particle. However, a problem on the storage ability of the ink is remained in this method and the level of light fastness and image quality is not satisfactory for obtaining an image comparable to the image of silver salt photography. Moreover, when such the colored fine particle is used, the colored fine particle is mounted on the surface of the recording medium in the image area so as to form roughed surface. As a result of that the glossiness of the image is reduced.

JP O.P.I. Publication No. 2001-335734 proposes that a colored fine particle having small particle diameter can be obtained by addition of a hydrophobic high-boiling organic solvent additionally to the oil-soluble dye and the resin. However, the glossiness has almost not be improved even when the particle diameter is made small since the particle number should be increased to obtained the necessary image density.

As above-mentioned, the aqueous ink containing the colored fine particle using the oil-soluble dye or the pigment has problems as to the glossiness, friction resistively and smoothness compared with the image formed by the silver salt photography. Therefore, further improvement is required even though such the ink has latent possibility of solving the problems of the usual aqueous ink using the water-soluble dye or the pigment dispersion.

SUMMARY OF THE INVENTION

The invention is investigated based on the foregoing problems. The object of the invention is to provide an ink-jet image recording method improved in the glossiness, the friction resistively and the difference of the smoothness between the image area and the non-image area.

The invention and the embodiments thereof are described below.

An ink-jet image recording method using an aqueous ink containing a colorant and a resin and satisfying the following Formula 1;

$$15 \leq w \leq 150 \qquad \text{Formula 1}$$

wherein, w is a parameter expressed by the following Formula 2;

$$w=[(dm+ds)/\{(NV \times vd)/r^3\}] \times 10{,}000 \qquad \text{Formula 2}$$

wherein, dm and ds are each a recording density in dpi in the direction of the primary-scanning and the secondary-scanning, respectively, NV is the colored particle content in the ink in weight percent, vd is the radius in meter and r is the radius in meter of the ink droplet; dpi is the number of dot per 25.4 mm.

In the ink-jet image recording method, w is preferably from 20 to 130.

The colorant is preferably an oil-soluble dye in the ink-jet image recording method.

A set of two or more aqueous inks having different colorant density of the same color is preferably employed in the ink-jet image recording method.

A set of two or more aqueous magenta inks having different colorant density and a set of two or more aqueous cyan inks having different colorant density are preferably employed in the ink-jet image recording method.

The set of aqueous inks contains a high colorant density aqueous ink and a low colorant density aqueous ink is preferably employed in the ink-jet image recording method. In this instance the ratio of (colorant density of the low colorant density ink)/(colorant density of high colorant density ink) is preferably from 0.1 to 1.0, more preferably from 0.2 to 0.5, and more preferably 0.25 to 0.4.

The preferable example of the resin is polyvinyl alcohol in the ink.

The volume average radius of the colored particles is preferably from 5 to 100 nm.

BRIEF DESCRIPTION OF THE DRAWINGS

FIG. 3($b$) is a cross section view.

DETAILED DESCRIPTION OF THE INVENTION

Figure 1:
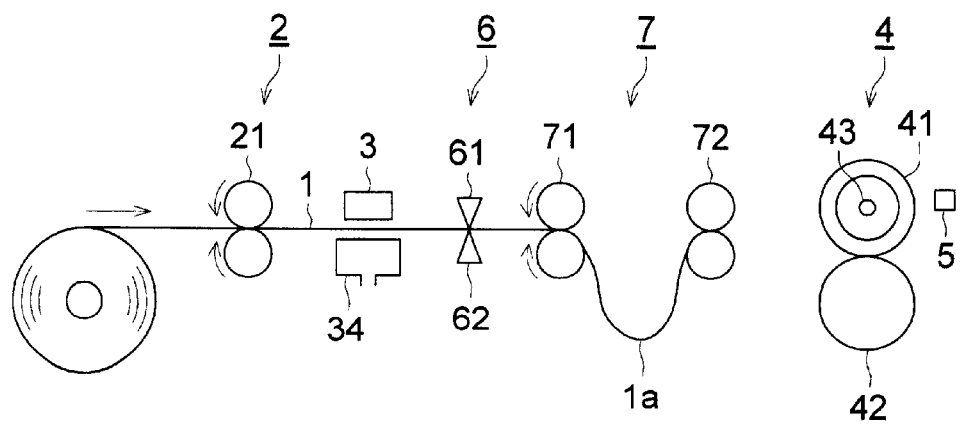
FIG. 1 shows a schematic drawing of an example of the ink-jet recording apparatus having a heating roller usable in the invention.

Usually in ink-jet apparatus, a record is formed on a recording medium by an ink droplet which is released and flied from an ink-jet head. The recording methods include a method in which the ink droplet is released while moving the head, primary-scanning, and the recording medium is moved in the direction perpendicular to the moving direction of the head, secondary-scanning, and a method in which the head constituted by many nozzles integrated in a line-shape is fixed and the recording medium is moved in the direction perpendicular to the line of the nozzles, secondary-scanning.

The ink used in the invention is an aqueous ink containing a colored particle comprising a colorant and a resin. In the ink-jet image recording method, the ink satisfies the following Formula 1.

$$15 \leq w \leq 150 \qquad \text{Formula 1}$$

In the Formula, w is a parameter represented by the following $$w=[(dm+ds)/\{(NV \times vd)/r^3\}] \times 10{,}000 \qquad \text{Formula 2}$$

wherein, ds is a recording density in dpi in a direction of the recording medium moves and dm is a recording density in dpi in a direction perpendicular to the direction of the recording medium moves, NV is the colored particle content in the ink in weight percent, vd is a volume average radius in meter of the colored particles and r is the radius in meter of the ink droplet; dpi is dot per inch, that is, the number of dots per 25.4 mm.

In the invention, w is from 15 to 150, preferably from 20 to 130.

The direction in which a recording medium is conveyed during image recording is called as a secondary-scanning direction, and the direction perpendicular to the secondary-scanning direction is called as a primary direction.

The amount of released ink droplet, radius of the ink droplet and the recording density in each direction can be selected by controlling the nozzle driving condition, the ink jet head driving condition and the feeding condition of the recording medium.

The volume average radius in meter of the colored particles is preferably from 5 to 100 nm. The colored particle may be called as a colored fine particle hereafter.

The inventors have investigated regarding the glossiness and the smoothness of the image formed by the aqueous ink containing the colored fine particles. As a result of that, it has been found that the number of the colored fine particles in the ink and the recording density on occasion of the image recording considerably influence on the glossiness of the image. Namely, the term of $\{(NV \times vd)/r^3\}$ in Formula 2 is proportional to the number of the particle in the ink droplet released from the ink-jet head. At the beginning, the inventors assumed that the particle number in the unit area of the recorded image relates to the glossiness, and investigated the correlation between the particle number per unit area and glossiness. However, no clear correlation could be found. As a result of further investigation, it has been found that the clear correlation can be obtained by considering the product of the recording density in the primary-scanning direction and that in the secondary-scanning direction expressed by (dm×ds).

It is supposed that the ink droplet can isolatively easily form the dot on the recording medium by setting the size of the released droplet and the dot number per unit area into a specified range since the product of the recording density in the primary-scanning direction and that in the secondary-scanning direction corresponds to the dot number in the unit area even though the physical meaning of such the result is not clear. It has been considered that the colored fine particle is not coagulated or merged with another colored fine particle and isolatively fixed on the recording medium so as to raise the glossiness when the ink droplet isolatively forms the dot.

It is understood from the relation between Formulas 1 and 2 that w is decreased by increasing the number of the colored fine particles per ink droplet and reducing the image recording density.

It has been found by the inventor that the colored fine particle can isolatively exist on the recording medium when the image is recorded by the ink-jet recording method in which the value of w is from 15 to 150. The value of w is lowered accompanied with the increasing of the colored fine particle number by 1) increasing the content of the colored fine particle in the ink, 2) reducing the radius of the colored fine particle and 3) increasing of the radius of the ink droplet. It is supposed that when the value of w is less than 15, the coagulation and merging of the colored fine particles is exceeds the acceptable degree so as to increase the roughness of the image surface and to reduce the glossiness.

When the recording density is largely raised, the value of w exceeds 150. Under such the condition, the dots are excessively overlapped with together. As a result of that, it is supposed that the particle number per dot is increased and the colored fine particles are excessively coagulated or merged so as to degrade the glossiness.

The friction resistively is also raided when the value of w is within the range of from 50 to 150. It is supposed that the adhesion of the colored fine particle with the recording medium is strengthened so as to be effectively fixed since the colored fine particles are not excessively coagulated or merged with together. The difference of the smoothness between the image area and that of non-image area is disappeared so as to a natural image can be obtained by the same reason.

The aqueous ink comprises a colored fine particles containing a resin and a colorant, and various kinds of conventional additives.

The resin employed in the colored fine particles is described.

In the present invention, various polymers may be employed, but particularly preferred polymers include polymers having an acetal group as a major functional group, polymers having a carbonic acid ester, polymers having a hydroxyl group, and those having an ester group. Said polymers may have a substituent which may be comprised of a straight chain, a branched chain, or a cyclic structure. Various types of said polymers having a functional group are commercially available, but may be synthesized using conventional methods. Further, copolymers of these may be obtained as follows. For example, an epoxy group is introduced into one polymer molecule, and subsequently, the resultant polymer undergoes condensation polymerization with other polymers. Said polymers may also be obtained by carrying out graft polymerization utilizing light as well as radioactive rays.

Listed as polymers having acetal as a major group are polyvinyl butyral resins, which include, for example, #2000-L, #3000-1, #3000-2, #3000-4, #3000-K, #4000-1, #4000-2, 5000-A, #6000-C, and #6000-EP, all manufactured by Denki Kagaku Kogyo Kabusikikaisha, and BL-1, BL-1H, BL-2, BL-2H, BL-5, BL-10, BL-S, BL-SH, BX-10, BX-L, BM-1, BM-2, BM-5, BM-S, BM-SH, BH-3, BH-6, BH-S, BX-1, BX-3, BX-5, KS-10, KS-1, KS-3, and KS-5, all manufactured by Sekisui Chemical Co., Ltd.

Said polyvinyl butyral resins are obtained as derivatives of PVA (polyvinyl alcohol). The acetylation ratio of hydroxyl group of original PVA is, at maximum, approximately 80 mol percent, and is commonly from about 50 to 80 mol percent. Incidentally, acetal, as described herein, does not refer to a 1,1-diethoxyethane group under its narrow definition, but refers to common orthoaldehyde compounds. The polymer composing shell part which is the outermost is composed of preferably 5–50 mol %, more preferably 10–30 mol % monomers containing hydroxy group. The polymer is also composed of preferably not more than 10 mol % monomers containing acetyl group.

The polymer having acetal as a major group is one containing at least 30 mol % oxygen atom forms acetal group among oxygen atoms in the polymer.

Employed as other polymers containing acetal as a major functional group may be the Iupital Series, manufactured by Mitsubishi Engineering-Plastics Corporation.

Listed as polymers having carbonic acid esters as a major functional group are polycarbonate resins, which includes, for example, the Iupilon Series and the NOVAEX Series, both being manufactured by Mitsubishi Engineering-Plastics Corporation., Ltd. Said Iupilon Series is manufactured employing Bisphenol A as a raw material and those having various molecular weight may be employed, even though said molecular weight may differ depending upon its determination method. Said NOVAREX Series may be employed which has a molecular weight of 20,000 to 30,000 and a glass transition point of approximately 150° C.

The polymers having a carbonic acid ester as a major functional group, as described herein, refer to those in which at least 30 mol percent of oxygen atoms incorporated in said polymers contribute to the formation of said carbonic acid ester.

Listed as polymers having a hydroxyl group as a major functional group are PVAs. Many PVAs exhibit low solubility in organic solvents, while PVAs having a low saponification value exhibit higher solubility. PVAs having high water solubility may be employed in such a manner that they are added to a water phase and after removing organic solvents, are adsorbed onto suspended polymers.

Employed as PVAs may be commercially available products which include, for example, Kuraray POVAL PVA-102, PVA-117, PVA-CSA, PVA-617, and PVA-505, and in addition, special brand PVAs as a sizing agent, and heat fusion molding PVAs. Employed as other functional polymers may be MP-203, HL-12E, and SK-5102. Those having a degree of saponification of at least 50 mol percept are commonly employed. On the other hand, it is also possible to employ those having a degree of saponification of approximately 40 mol percent such as LM-10HD. It is further possible to employ those having a hydroxyl group which are not included in common PVA. It is still further possible to employ those in which at least 20 mol percent of oxygen atoms included in polymers form a hydroxyl group.

Listed as polymers having an ester group as a major functional group are, for example, methacrylic resins. It is possible to employ 560F, 60N, 80N, LP-1, SR8500, and SR6500 of the Delpet Series, manufactured by Asahi Kasei Co., Ltd. The polymers having an ester group as a major functional group, as described herein, refer to those in which at least 30 mol percent of oxygen atoms incorporated in said polymers form said ester group.

Vinyl resins prepared by polymerizing monomers having ethylenical unsaturated bond can be preferably employed. Styrene resins, acryl resins are also preferably employed. Examples of practical resins include those prepared by a conventional manner such as radical polymerization, cationic polymerization or anionic polymerization of monomer such as styrene, acrylic acid, methacrylic acid, methyl acrylate, ethyl acrylate, butyl acrylate, isobutyl acrylate, hexyl acrylate, 2-hydroxyethyl acrylate, 2-ethylhexyl acrylate, methyl methacrylate, ethyl methacrylate, butyl methacrylate, isobutyl methacrylate, hexyl methacrylate, 2-hydroxyethyl methacrylate, and 2-ethylhexyl methacrylate.

These polymers may be employed individually or in combination. Further, when at least 50 percent by weight of said polymers are incorporated, other polymers, as well as inorganic fillers, may be incorporated.

Copolymers of these polymers may preferably be employed. Such copolymers may be prepared employing the following method. For example, polymers having a hydroxyl group are copolymerized with various polymers in such a manner that said hydroxyl group is allowed to react with monomers such as glycidyl methacrylate having an epoxy group, and subsequently, the resultant product undergoes copolymerization with methacrylic acid ester monomers, employing suspension polymerization.

In the fine colored fine particle-containing water-based ink of the present invention, the polymers employed in said fine colored fine particles are preferably blended with said ink at a ratio of 0.5 to 50 percent by weight and more preferably at a ratio of 0.5 to 30 percent by weight. When the blended amount of said polymers is less than 0.5 percent by weight, the protection properties of the colorant are not sufficient. On the other hand, when said blended amount exceeds 50 percent by weight, the storage stability as suspension ink is degraded and printer head clogging occasionally occurs due to the increase in viscosity as well as coagulation of the suspension at the nozzles tips. As a result, said blended amount is preferably adjusted to the range described above.

The colored fine particle relating to the invention is described in detail below.

The colored fine particle relating to the invention can be prepared by various methods. For example, the following methods can be applied: a method in which an oil-soluble colorant is dissolved in an monomer and emulsified in water and the monomer is polymerized to form a polymer including the colorant; a method in which a polymer and a colorant are dissolved in an organic solvent and the solution is emulsified in water and then the solvent is removed; and a method in which a porous fine particle of polymer is added to a solution of a colorant so that the colorant is adsorbed and immersed in the polymer particle. Furthermore, a method for forming a shell covering the colored fine particle by polymer can be applied.

The following methods can be applied for providing the polymer shell: a method in which a dispersion of water-soluble polymer is added to an aqueous suspension of the core so that the polymer is adsorbed on the core; a method in which monomer is gradually dropped into the core suspension so that the polymer is deposited onto the core accompanied with the polymerization of the monomer and a method in which polymer dissolved in an organic solvent and gradually dropped into the suspension of the core so that the polymer is adsorbed onto the core accompanied with the separation of the polymer. Furthermore, a method for forming the core/shell structure on one step is considerable. Examples of such the method include a method in which the polymer to be the core and the polymer to be the shell are together heated and dissolved and suspended in water and polymerized; and a method in which the foregoing liquid is gradually dropped into water containing a micelle of surfactant so as to be emulsion polymerized. Moreover, a method can be also applied in which the colorant is dissolved or dispersed in the monomer capable forming the core and the monomer capable of forming the shell and the monomers are polymerized by a suspension polymerization or emulsion polymerization.

The colored fine particle according to the invention either may be one without shell or one with shell. However, it is preferred that the colored fine particle have the core/shell structure constituted by Resin A containing the colorant and Resin B covering Resin A. In such the case, the amount of the polymer of the shell is preferably from 5% to 95% of the whole amount of polymer. When the amount of the polymer is less than 5%, the thickness of the shell is insufficient and a part of the core containing much colorant is easily exposed. When the amount of the shell is excessive, the amount of the polymer of the shell is relatively decreased so that the colorant protect function of the shell tends to be lowered. The amount of the shell is more preferably from 10% to 90% by weight.

The amount of the colorant is preferably from 20% to 1,000% by weight. The density of the printed image is made to insufficient when the amount of the colorant is too lower; and the sufficient protective effect of the polymer cannot be obtained when the ratio of the colorant is too high.

Evaluation of Core/Shell Formation Status

In the invention, it is important to evaluate that the particle is actually have core/shell structure or not. In the invention, the method for analysis is limited from the viewpoint of the resolution ability since the diameter of the individual particle is very small as not more than 150 nm. As the analysis method suitable for such the purpose, a transmission electron microscope (TEM) and a time of flight type secondary ion mass spectrometry apparatus (TOF-SIMS) can be applied. When the colored fine particle having the core/shell structure is observed by TEM, the particle can be observed by coating and drying the suspension on a carbon-supporting layer. It is necessary to dye the colored fine particle for evaluate the formation status of the core/shell structure since the observed image by the TEM is usually monochromatic. The colored fine particle constituted by only core is dyed and observed by the TEM, and then compared with the particle with the shell. Furthermore, the fine particles with shell and those without shell are mixed, dyed and subjected to observation by the TEM. Then it is confirmed that the ratio of the particles different from each other in the degree of the dying accords with the ratio of the particle with shell to that without shell. It is confirmed by the TOF-SIMS that the dye near the surface of the particle is reduced by the presence of shell compared with the particle of core only. When an element which is not contained in the polymer is contained in the colorant, the presence of the shell containing small amount of the colorant can be confirmed by utilizing the element as the probe. When such the element is not contained, the colorant content in the shell can be compared with that in the particle having no shell by the use of suitable dying agent. The core/shell structure can be more clearly observed by the method in which the core/shell particle is embedded in epoxy resin, and sliced by a microtome to make an ultra thin slice, and the slice is dyed. An element capable of being a probe is contained in the polymer of the dye, the composition of the core and shell and the distribution of the dye in the core and the shell can be estimated by the TEM.

A volume average particle diameter of the colored fine particles is preferably from 10 to 200 nm, more preferably from 20 to 120 nm, and particularly preferably from 20 to 100 nm. The effects of the invention are enhanced by making the volume average particle diameter of the particles to the value specified by the invention.

The volume average particle diameter can be measured by a particle diameter measuring apparatus available in the market according to a light scattering method, an electrophoresis method and a laser trap method, for example, laser refraction particle diameter measuring apparatus SLAD 1100, manufactured by Shimadzu Corp., particle diameter measuring apparatus Horiba LA-920, manufactured by Horiba Seisakusho Co., Ltd., and Zetasizer 1000, manufactured by Malvern Co., Ltd.

Employed as colorants in the present invention may be various colorants which are mainly divided into dyes and pigments. Listed as dyes may be examples such as oil-base (oleophilic) dyes, dispersion dyes, direct dyes, acidic dyes, and basic dyes. It is preferable to employ oil-base from the viewpoint of the elution value of the present invention.

Preferably employed as colors are yellow, magenta, cyan, black, blue, green, and red. Dyes of yellow, magenta, cyan, and black are particularly preferred. Oil-base dyes include dyes which exhibit oil solubility by forming salts of water-soluble dyes with long chain bases. Specific examples of particularly preferred oil-base dyes include, but are not limited, to the following examples: Valifast Yellow 4120, Valifast Yellow 3150, Valifast Yellow 3108, Valifast Yellow 2310N, and Valifast Yellow 1101; Valifast Red 3320, Valifast Red 3304, and Valifast Red 1306; Valifast Blue 2610, Valifast Blue 2606, and Valifast Blue 1603; Oil Yellow GG-S, Oil Yellow 3G, Oil Yellow 129, Oil Yellow 107, and Oil Yellow 105; Scarlet 308; Oil Red RR, Oil Red OG, and Oil Red 5B; Oil Pink 312; Oil Blue BOS, Oil Blue 613, and Oil Blue 2N; Oil Black BY, Oil Black BS, Oil Black 860, Oil Black 5970, Oil Black 5906, and Oil Black 5905, all being manufactured by Orient Chemical Industries Co., Ltd.; Kayaset Yellow SF-G, Kayaset Yellow K-CL, Kayaset Yellow GN, Kayaset Yellow A-G, and Kayaset Yellow 2G; Kayaset Red SF-4G, Kayaset Red K-BL, and Kayaset Red A-B; Kayaset Magenta 312; and Kayaset Blue K-FL, all being manufactured by Nippon Kayaku Co., Ltd.;

FS Yellow 1015, FS Magenta 1404, FS Cyan 1522, and FS Blue 1504; C.I. Solvent Yellow 88, C.I. Solvent Yellow 83, C.I. Solvent Yellow 82, C.I. Solvent Yellow 79, C.I. Solvent Yellow 56, C.I. Solvent Yellow 29, C.I. Solvent Yellow 19, C.I. Solvent Yellow 16, C.I. Solvent Yellow 14, C.I. Solvent Yellow 04, C.I. Solvent Yellow 03, C.I. Solvent Yellow 02, and C.I. Solvent Yellow 01; C.I. Solvent Red 84:1, C.I. Solvent Red 84, C.I. Solvent Red 218, C.I. Solvent Red 132, C.I. Solvent Red 73, C.I. Solvent Red 72, C.I. Solvent Red 51, C.I. Solvent Red 43, C.I. Solvent Red 27, C.I. Solvent Red 24, Solvent Red 18, and Solvent Red 01; C.I. Solvent Blue 70, C.I. Solvent Blue 67, C.I. Solvent Blue 44, C.I. Solvent Blue 40, C.I. Solvent Blue 35, C.I. Solvent Blue 11, C.I. Solvent Blue 02, and C.I. Solvent Blue 01; C.I. Solvent Black 43, C.I. Solvent Black 70, C.I. Solvent Black 34, C.I. Solvent Black 29, C.I. Solvent Black 27, C.I. Solvent Black 22, C.I. Solvent Black 7, and C.I. Solvent Black 3; C.I. Solvent Violet 3; and C.I. Solvent Green 3 and C.I. Solvent Green 7, all being manufactured by Arimoto Chemical Co., Ltd.

Further, metal complex dyes, as shown in Japanese Patent Publication Open to Public Inspection Nos. 9-277693, 10-20559, and 10-30061, are preferably employed. The preferred structure is represented by Formula (1) described below.

$$M(Dye)_1(A)_m \quad \text{Formula (1)}$$

wherein M represents a metal ion; Dye represents a dye capable of forming a coordination bond with metal; A represents a ligand except for said dye; 1 represents 1, 2, or 3; and m represents 0, 1, 2, or 3. When m represents 0, 1 represents 1 or 2. In that instance, Dye may be the same or different. Listed as metals represented by M are, for example, ions of Al, Co, Cr, Cu, Fe, Mn, Mo, Ni, Sn, Ti, Pt, Pd, Zr, and Zn. From the viewpoint of color as well as various kinds of durability, ions of Ni, Cu, Cr, Co, Zn, and Fe are particularly preferred. Of these, Ni ions are most preferred.

Ligands represented by A are mono- or di- valent ligand, such as halogenide ion, carboxylic acid derivatives and those represented by formula (A).

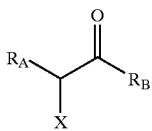

Formula (A)

$R_A$ represents a cyano group, acyl group, alkyloxycarbonyl group, cycloalkyl oxycarbonyl group, aryloxy carbonyl group or heterocyclic group.

$R_B$ represents an alkyl group, cycloalkyl group, alkenyl group, alkynyl group, aryl group, aralkyl group or heterocyclic group.

$R_C$ represents a cyano group, alkyloxycarbonyl group, cycloalkyl oxycarbonyl group or aryloxy carbonyl group.

Considered as dyes, represented by Dye, capable of forming a coordination bond with metal may be those having various structures. Dyes having a ligand in the skeleton of conjugated methine dyes, azomethine dyes and azo dyes are preferred.

Specific examples of particularly preferred dispersion dyes include, but are not limited to, the following:

C.I. Disperse Yellow 5, 42, 54, 64, 79, 82, 83, 93, 99, 100, 119, 122, 124, 126, 160, 184:1, 186, 198, 199, 204, 334, and 237; C.I. Disperse Orange 13, 39, 31:1, 33, 49, 54, 55, 66, 73, 118, 119, and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 230, 240, 258, 277, 278, 283, 311, 323, 3543, 348, 356, and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; and C.I. Disperse Green 6:1 and 9.

The dyes represented by the following formula (1), (2)

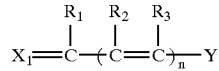

Formula 1

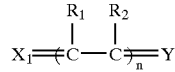

Formula 2

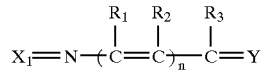

Formula 3

In Formulas 1 through 3, $X_1$ is a coupler residue used in silver halide color photographic material. Examples of the residue include a derivative of acetanilide, 5-pyrazoline, imidazole, pyrazolopyrrole, pyrazoloimidazole, pyrazolotriazole, pyrazolotetrazole, pyrazolopyrimidine-7-one, barbituric acid, thiobarbituric acid, rhodanine, hydantoin, thiohydantoin, oxazoline, iso-oxazolone, indandione, pyrazolidinedione, oxazolinedione, hydroxypyridone, cyclohexadienone, phenol or naphthol. n is 0, 1 or 2.

Y is a five or six member aromatic cyclic carbon group or heterocyclic group and preferable example thereof includes derivative of benzene, pyridine, pyrrole, thiazole, oxazole, furan and thiophene.

$R_1$, $R_2$ and $R_3$ each represents a hydrogen atom, halogen atom or a monovalent substituent such as an alkyl group, cycloalkyl group, aralkyl group, aryl group, alkoxy group, aryloxy group, acylamino group, sulfonamide group, ureide group, alkoxycarbonylamino group, alkylthio group, arylthio group, alkoxycarbonyl group, carbamoyl group, sulfamoyl group, sulfonyl group and amino group Dyes represented by formula (1), particularly n being 0, are preferably employed among the dyes mentioned above.

Pigments employed in the present invention include, but are not limited to, the examples shown below. Particularly preferred specific examples of black pigments include: No. 2300, No. 900, MCF-88, No. 33, No. 40, No. 45, No. 52, MA7, MA8, MA100, No. 2200B, all manufactured by Mitsubishi Chemical Corporation;

Raven 700, Raven 5750, Raven 5250, Raven 5000, Raven 3500, and Raven 1255, all manufactured by Columbia Co.; Regal 400R, Regal 330R, and Regal 660R; Mogul; Monarch 700, Monarch 800, Monarch 880, Monarch 900, Monarch 1000, Monarch 1100, Monarch 1300, and Monarch 1400, all manufactured by Cabot Co.;

Color Black FW1, Color Black Color FW2, Black Color Black FW2V, Color Black FW18, Color Black FW200, Color Black S150, Color Black S160, and Color Black S170; Printex 35, Printex U, Printex V, Printex 140U, and Printex 140V; Special Black 6, Special Black 5, Special Black 4A, and Special Black 4, all manufactured by Degussa Corporation; and Maxsorb G-40, Maxsorb G-15, and Maxsorb G-08, all being manufactured by Kansai Netsukagaku Co., Ltd.

Yellow pigments include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 128, C.I. Pigment Yellow 129, C.I. Pigment Yellow 151, and C.I. Pigment Yellow 154.

Magenta pigments include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (ca), C.I. Pigment Red 57:1, C.I. Pigment Red 112, C.I. Pigment Red 123, C.I. Pigment Red 168, C.I. Pigment Red 184, and C.I. Pigment Red 202.

Listed as cyan pigments are C.I. Pigment Blue 1, C.I. Pigment Blue 2, C.I. Pigment Blue 3, C.I. Pigment Blue 15:3; C.I. Pigment Blue 15:34, C.I. Pigment Blue 16, C.I. Pigment Blue 22, C.I. Pigment Blue 60, C.I. Vat Blue 4, and C.I. Pigment Blue 60.

Colorant is preferably incorporated in colored fine particles in an amount of 1 to 30 weight %, preferably 1.5 to 25 weight % in an ink to obtain sufficient image density as well as stable store ability.

Preferable example of the aqueous solvent is represented by the formula (II).

$$A-B \qquad \text{Formula II}$$

In the above formula, A is a group containing a hydrophilic substituent and B is a hydrophobic group.

The group represented by A is a group containing a hydrophilic substituent such as a hydroxyl group, a carboxyl group, a sulfoxide group, a sulfone group, a sulfonic acid group and 2-keto-1-pyrrolidinyl group. Among them, hydroxyl group is preferred.

B is a hydrophobic group which is preferably an aliphatic group or an aromatic group each having 3 to 10 carbon atoms. The aliphatic group having 4 to 8 carbon atoms is preferred.

The compounds represented by Formula II each have a structure analogous to a usual surfactant. The usual surfactant is forms a micelle in an aqueous solution at a low concentration.

The compounds represented by Formula II each preferably have no ability for forming the micelle. When the compound has the micelle forming ability, the viscosity of the ink is considerably raised when the concentration of the compound is over 1% since the interaction between the molecules is strong.

A water-miscible organic solvent is preferred as the water-miscible solvent usable in the invention. Concrete example of the solvent include an alcohol such as methanol, ethanol, propanol, iso-propanol, butanol, iso-butanol, sec-butanol, tert-butanol, pentanol, hexanol, cyclohexanol and benzyl alcohol; a poly-valent alcohol such as ethylene glycol, diethylene glycol, triethylene glycol, polyethylene glycol, propylene glycol, dipropylene glycol, polypropylene glycol, butylenes glycol, hexanediol, pentane diol, glycerol, hexanetriol and thioglycol; a poly-valent alcohol ether such as ethylene glycol monomethyl ether, ethylene glycol monoethyl ether, ethylene glycol monobutyl ether, ethylene glycol monophenyl ether, diethylene glycol monomethyl ether, diethylene glycol monoethyl ether, diethylene glycol monobutyl ether, diethylene glycol dimethyl ether, propylene glycol monomethyl ether, ethylene glycol monomethyl ether acetate, triethylene glycol monomethyl ether, triethylene glycol monoethyl ether, triethylene glycol monobutyl ether, triethylene glycol dimethyl ether, dipropylene glycol monopropyl ether and tripropylene glycol dimethyl ether; an amine such as ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine and tetramethylpropylenediamine; an amide such as formamide, N,N-dimethylformamide and N,N-dimethylacetoamide; a heterocyclic compound such as 2-pyrrolidone, N-methylpyrrolidone, N-cyclohexyl-2-pyrrolidone, 2-oxazolidone and 1,3-dimethyl-2-imidazolidinone; a sulfoxide such as dimethylsulfoxide; a sulfone such as sulfolane; a sulfonate such as sodium 1-butanesulfonate; urea; acetonitrile and acetone. At least one kind of the water-miscible solvent is preferably the poly-valent alcohol ether or the poly-valent alcohol. Ethylene glycol monobutyl ether or butyl cellosolve, diethylene glycol monobutyl ether, triethylene glycol monobutyl ether and ethylene glycol monophenyl ether are preferred as the preferable poly-valent alcohol ether, and 1,2-hexanediol and 1,2-pentanediol are preferred as the poly-valent alcohol. Triethylene glycol monobutyl ether and 1,2-hexanediol are particularly preferred.

The water-miscible organic solvent is employed in an amount of 10 to 60 percent by weight, preferably 20 to 50 percent by weight in whole weight of ink.

An ink of the present invention, utilizing water as a medium, comprises a polymer suspension incorporating the foregoing colorant, and various kinds of conventional additives. Examples of the additives that may be contained in the suspension are; a wetting agent such as polyalcohols, a dispersant, an antifoaming agent such as a silicone type, an anti-mold agent such as chloromethyl phenol, and/or a chelating agent such as EDTA, or an oxygen absorbing agent such as a sulfite salt type.

The dispersing agents having HLB value of 8 to 18 is preferable, from the viewpoint of exhibiting the desired effects as dispersing agents as well as exhibiting effects to retard an increase in diameter of the particles in suspension.

It is possible to employ commercially available products as said dispersing agents. Listed as such commercially available products are, for example, dispersing agents such as Demol SNB, MS, N, SSL, ST, and P (Demol being the trade name), manufactured by Kao Corp.

The dispersing agents is employed in the ink of the present invention preferably from 0.01 to 10 percent by weight, in view of allowing the diameter of particles in the suspension small, and the stability of the suspension.

Further, said antifoaming agents are not particularly limited, and it is possible to employ commercially available products. Listed as such commercially available products are, for example, KF96, 66, and 69; KS68, 604, 607A, 602, and 603; and KM73, 73A, 73E, 72, 72A, 72C, 72F, 82F, 70, 71, 75, 80, 83A, 85, 89, 90, 68-1F, and 68-2F, all being manufactured under such type numbers by Shin-Etsu Silicone Co. The blending ratio of these compounds is not particularly limited, but the blending ratio of these in the fine colored fine particle-containing water-based ink of the present invention is preferably from 0.001 to 2 percent by weight.

The production method of the ink of the present invention will now be described. It is possible to produce the ink of the present invention employing various types of emulsification methods.

Volume average particle diameter of the colored fine particles is preferably from 10 to 200 nm. The volume average diameter can be obtained, for example, by optionally selecting or combining the kind or amount of the dispersing agent, or emulsifying methods mentioned later.

Various emulsification methods may be employed. The examples of said-methods are summarized in, for example, the description on page 86 of "Kinohsei Nyukazai•Nyukagijutsu no Shinpo to Ohyohtenkai (Functional Emulsifiers and Progress and Application of Emulsifying Technology) CMC". In the present invention, preferably employed are emulsification dispersion devices utilizing ultrasonic, high speed rotation shearing, and high pressure.

Emulsification dispersion utilizing ultrasonic may be carried out employing either a batch system or a continuous system. Said batch system is suitable for production of samples in a relatively small amount, while said continuous system is suitable for production of samples in a relatively large amount. In said continuous system, it is possible to employ devices such as UH-600SR, manufactured by MMT. In the case of said continuous system, ultrasonic application time can be obtained based on the formula of volume of a dispersion chamber/flow rate×circulation frequency. When a plurality of ultrasonic devices is employed, ultrasonic application time can be calculated as the sum of said applying time of each device. In practice, ultrasonic applying time is required to be at least 3 seconds. If emulsification is finished within said time, said ultrasonic homogenizer is not needed. On the other hand, if said applying time is at least 10,000 seconds, load applied to the process markedly increases and in practice, it is necessary to decrease the emulsification dispersion time through selecting emulsifiers and the like. Accordingly, 10,000 seconds are not needed. Said time is preferably from 10 to 2,000 seconds.

Employed as emulsification dispersion devices utilizing high speed rotation shearing may be disper mixers described on pages 255 and 256 of "Kinohsei Nyukazai•Nyukagijutsu no Shinpo to Ohyohtenkai (Functional Emulsifiers and Progress and Application of Emulsifying Technology) CMC", homomixers described on page 251 of the same, and ultra-mixers described on page 256 of the same. Any of these types may be employed depending upon the viscosity of compositions during emulsification dispersion. In these emulsification dispersion devices utilizing high speed rotation shearing, the rotation frequency of the stirring blade plays a major role. Clearance between the blade and the stator is commonly about 0.5 mm, which is not markedly narrow. As a result, shearing force depends on the peripheral speed of the stirring blade. The stirring blade, having a peripheral speed of 5 to 150 m/second, can be applied to emulsification dispersion of the present invention. When said peripheral speed is less than the lower limit, it is frequently impossible to decrease the particle diameter to the desired level, even though the emulsification time is extended. On the other hand, in order to achieve a peripheral speed of 150 m/second, it is required to markedly enhance the performance of the driving motor. Therefore, the peripheral speed is more preferably from 20 to 100 m/second.

In emulsification dispersion utilizing high pressure, LAB 2000 (manufactured by SMT Co.) may be employed. Its emulsification dispersion ability depends on the pressure applied to the samples. Said pressure is preferably from 10 to 500 MPa. If desired, the target particle diameter may be obtained by several repetitions of emulsification and dispersion. When said pressure is less than the lower limit, the target particle diameter is not frequently obtained, even though emulsification dispersion is repeated many times. Incidentally, it is not practical to achieve a pressure of 500 MPa because an excessively large load is applied to the device. Accordingly, the applied pressure is more preferably from 50 to 200 MPa.

These emulsification dispersion devices may be employed individually, or if desired, in combination. If colloid mills and flow jet mixers are used individually, they cannot achieve the objectives of the present invention. However, when they are employed in combination with said devices, it is possible to enhance the desired effects of the present invention in such a manner that emulsification dispersion can be carried out in a shorter time.

Further, it is possible to produce the ink of the present invention utilizing phase inversion emulsification, instead of employing said devices.

The phase inversion emulsification is comprised of the following processes. The aforesaid polymers are dissolved in organic solvents such as esters and ketones, along with the aforesaid dyes. If desired, carboxyl groups in said polymers are ionized by the addition of neutralizers. After adding water, said organic solvents are removed so as to result in water-based phase inversion.

After finishing phase inversion, the resultant system is heated under reduced pressure so as to remove said ester and ketone based solvents as well as the specified amount of water, whereby the fine colored fine particle-containing water-based ink of the present invention, which has the desired concentration, is prepared.

The surface tension of the ink is preferably from 25 mN/m to 50 mN/m, more preferably from 30 mN/m to 40 mN/m. The surface tension of the ink according to the invention is preferably controlled by using a surfactant and the kind and the amount of thereof is suitably selected.

The pH value of the ink is preferably from 6.0 to 11.0, more preferably from 8.0 to 10.0. Examples of the pH controlling agent usable in the ink according to the invention include an organic amine such as monoethanolamine, diethanolamine and triethanolamine; an inorganic alkaline agent such as a hydroxide of alkaline metal, for example, sodium hydroxide, lithium hydroxide and potassium hydroxide; an organic acid and an inorganic acid.

One or more kinds of an anionic surfactant, a nonionic surfactant and a cationic surfactant may be used in the ink according to the invention. Example of the surfactant usable in the invention include the anionic surfactant such as a dialkylsulfosuccinate, an alkylnaphthalenesulfonate and a fatty acid salt; the nonionic surfactant such as a polyoxyethylene alkyl ether, a polyoxyethylene alkylallyl ether, an acetylene glycol, a polyoxyethylene-polyoxypropylene block copolymer; and the cationic surfactant such as an alkylamine salt and a quaternary ammonium salt, even though the usable surfactant is not limited to the abovementioned. The anionic surfactant and the nonionic surfactant are preferred.

In the invention, a polymer surfactant is also usable. Examples of the polymer surfactant include a styrene/acrylic acid/alkyl acrylate copolymer, a styrene/acrylic acid copolymer, a styrene/maleic acid/alkyl acrylate copolymer, a styrene/maleic acid copolymer, a styrene/methacrylic acid/ alkyl acrylate copolymer, a styrene/methacrylic acid copolymer, a styrene/maleic acid half ester copolymer, a vinylnaphthalene/acrylic acid copolymer and a vinylnaphthalene/maleic acid copolymer.

The ink according to the invention may contain a water-soluble polymer or a dispersion of water-insoluble polymer.

A preferable example of the water-soluble polymer is a natural polymer. Examples of the natural water-soluble polymer include a protein such as glue, gelatin, casein and albumin; a natural gum such as gum arabic and tragacanth gum; a glucoside such as saponin; an alginic acid derivative such as alginic acid, propylene glycol alginate, triethanolamine alginate and ammonium alginate; and a cellulose derivative such as methyl cellulose, carboxymethyl cellulose, hydroxyethyl cellulose and ethylhydroxyl cellulose.

Moreover, a synthesized polymer is also preferably usable as the water-soluble polymer. Examples of the synthesized polymer include an acryl resin such as a polyvinyl alcohol, a polyvinylpyrrolidone, a polyacrylic acid, an acrylic acid/ acrylonitrile copolymer, a vinyl acetate/acrylate copolymer and acrylic acid/acrylate copolymer; a styrene/acrylic resin such as a styrene/acrylic acid copolymer, a styrene/ methacrylic acid copolymer, a styrene/methacrylic acid/ acrylate copolymer, a styrene/α-methylstyrene/acrylic acid copolymer and a styrene/α-methylstyrene/acrylic acid/ acrylate copolymer; and a vinyl acetate copolymer such as a styrene/maleic acid, a styrene/α-methylstyrene/acrylic acid copolymer, a styrene/maleic anhydride styrene/α- methylstyrene/acrylic acid copolymer, a vinylnaphthalene/acrylic acid copolymer, a vinylnaphthalene/maleic acid copolymer, a vinyl acetate/ethylene copolymer, a vinyl acetate/vinylethylene fatty acid ester copolymer, a vinyl acetate/maleate copolymer, a vinyl acetate/crotonic acid copolymer, and a vinyl acetate/acrylic acid copolymer and a salt thereof. Among them, polyvinylpyrrolidone is particularly preferable example.

The molecular weight of the water-soluble polymer is preferably from 1,000 to 200,000, more preferably from 3,000 to 20,000. When the molecular weight is less than 1,000, the effect to inhibit the growing and coagulation of the colored fine particle, and when the molecular weight exceeds 200,000, problems such as viscosity rising and insufficient dissolution tend to be occurred.

The adding amount of the water-soluble polymer is preferably from 10% to 1,000%, more preferably from 50% to 200%, by weight of the amount of the dye. When the molecular weight is less than 10% by weigh, the effect to inhibit the growing and coagulation of the colored fine particle, and when the molecular weight exceeds 1,000% by weight, problems such as viscosity rising and insufficient dissolution tend to be occurred.

The water-insoluble-polymer dispersion (referred to latex hereafter) employed for the invention is not particularly restricted. Examples of the latexes include styrene-butadiene copolymers, polystyrene, acrylonitrile-butadiene copolymers, acrylic acid ester copolymers, polyurethane, silicone-acryl copolymers, acryl modified fluorine-containing resins, and the like. The latexes may be those in which polymer particles are dispersed in a dispersion medium in the presence or absence of an emulsifying agent. As an emulsifying agent, a surface-active agent is generally used, and a polymer having a water solubilizing group such as a sulfonic acid group or a carboxylic acid group (for example, a graft polymer having a water solubilizing group in the side chain or a polymer obtained by polymerizing a monomer having a water solubilizing group and a water insoluble monomer) is preferably used.

The ink of the present invention preferably contains soap free latexes. The soap free latexes herein referred to mean latexes which are prepared without employing emulsifying agents or latexes are prepared by using a polymer having a water solubilizing group such as a sulfonic acid group or a carboxylic acid group (for example, a graft polymer having a water solubilizing group in the side chain or a polymer obtained by polymerizing a monomer having a water solubilizing group and a water insoluble monomer) as an emulsifying agent.

Recently, other than latexes in which the whole of the latex polymer particles is uniform, there are core-shell type latexes in which the latex polymer particles have the difference in composition between the central portion and the peripheral portion in the polymer particles. In the invention, this type of latex also can be preferably used.

The average particle size of the latex polymer particles used in the ink of the present invention is preferably from 10 to 300 nm, and more preferably from 10 to 100 nm. When the average diameter of the latex polymer particles exceeds 300 nm, glossiness of images recorded tends to be degraded, and when the average particle size is less than 10 nm, water resistance or abrasion resistance may be degraded. It is possible to determine the particle size of the latex polymer particles, employing commercially available particle size measurement apparatus utilizing a light scattering method, an electrophoretic method, a laser Doppler method, and the like.

The latexes are added to the ink of the invention to give its solid content of from 0.1 to 20% by weight, and preferably 0.5 to 10% by weight based on the total weight of the ink. When the content ratio is less than 0.1 percent by weight, it is difficult to achieve sufficient effects regarding water resistance. In contrast, when the content ratio exceeds 20 percent by weight, there occur problems in that the viscosity of the ink tends to increases and the particle size of pigment particles dispersed in the ink tends to increase with an elapse of time, resulting in deterioration of storage stability of the ink.

The ink according to the invention such conventional additives may be employed optionally as viscosity adjuster, resistivity adjuster, film forming agent, UV absorber, anti-oxidant, anti-fading agent, fungicidal agent and rust preventive agent, for the purpose of improving various characteristics such as stabilizing jetting, compatibility to print head or ink cartridge, storage stability, image store ability and so on. The additives include oil particles of, such as, fluid paraffin, dioctyl phthalate, tricresyl phosphate, silicon oil etc.; a UV absorbent disclosed in Japanese Patent O.P.I. Publication Nos. 57-74193, 57-87988 and 62-261476; an anti-fading agent disclosed in Japanese Patent O.P.I. Publication Nos. 57-74192, 57-87988, 60-72785, 61-146591, 1-95091 and 3-13376; and a fluorescent brightening agent disclosed in Japanese Patent O.P.I. Publication Nos. 59-42993, 59-52689, 62-280069, 61-24271 and 4-219266.

It is preferable to use a plurality of ink each having different density for the same color. Further, it is more preferable that a set of two or more aqueous inks having different colorant density of the same color is employed for two or more colors, and it is preferable in particular that a set of two or more aqueous inks having different colorant density of the same color is employed for three or more colors.

A high quality image having smooth image without coarse feeling can be obtained by employing the set of aqueous ink including light color ink.

It is preferable to employ the set of two or more ink in magenta or cyan ink, in which color sensitivity of human being is high.

Colorant density ratio of each inks in the set of the aqueous ink is optional. It is preferable the ratio of the colorant density between the high density ink and low density ink, that is (density of low density ink)/(density of high density ink) is from 0.1 to 1.0, more preferably from 0.2 to 0.5, and particularly preferably 0.25 to 0.4, for the smooth reproduction of gradation.

The ink jet recording mediums used in the invention include plain paper, coated paper, a swell type ink jet recording paper sheet, in which an ink receiving layer capable of absorbing ink and swelling is provided on a paper substrate, a void type ink jet recording paper sheet, in which a porous ink receiving layer is provided on a paper substrate, and ink jet recording resin sheet in which a substrate of resin such as polyethylene terephthalate is used instead of a paper substrate. The use of the porous ink jet recording sheet is preferable and can provide the excellent performance in the invention.

As the porous recording medium, porous type ink-jet recording paper and porous type ink-jet recording film are usable. They are each a recording medium having a porous layer capable of absorbing the ink. The porous layer is formed by soft coagulum mainly constituted by a water-soluble binder and an inorganic fine particle.

Various methods have been known for forming the pores in the layer, for example, the following methods are applicable: a method in which a uniform coating liquid containing two or more kinds of polymer is coated on a substrate and the pores are formed by the phase separation of the polymers in the course of drying of the coated layer; a method in which a coating liquid containing solid particles and a hydrophilic or hydrophobic binder is coated on a substrate and dried, and thus dried ink-jet recording paper is immersed in water or a liquid containing suitable organic solvent for dissolving the solid particles to form the pores; a method in which a coating liquid containing a substance capable of foaming on the occasion of layer formation is coated on a substrate and foam is formed from the substance in the course of drying to form the pores; a method in which a coating liquid containing porous fine particles and a hydrophilic binder is substrate to form the pores in or between the porous solid particles; and a method in which a coating liquid containing a hydrophilic binder and solid particles and/or fine oil droplets in an amount of equal or more volume of the hydrophilic binder is coated on the substrate to form the pores between the solid particles. The porous layer formed by any methods gives satisfactory results when the ink according to the invention is used.

Resins composing colored fine particles contained in the ink are preferably caused to filming by fusion and compression by subjecting the recording medium after image forming to application of heat and/or pressure for the purpose of improving glossiness and storability against light. It is preferable to apply sufficient amount of heat or pressure or heat and pressure simultaneously to fuse and make filming the resin composing the colored fine particles completely from a point of view. From the other view point of rapid processing, it is preferable to process by heat or pressure within short period, which is not sufficient to fuse or make filming the resin completely if satisfactory image quality is obtained.

Though it is preferable to apply heat with heat source as high as possible to give sufficient amount of quantity of heat within short period, when the temperature is in excess it may cause deterioration of support of the recording medium, extreme curling, roughness of image surface, or roller stain. Therefore the temperature is preferably selected as of 100 to 200° C., more preferably 100 to 150° C. Pressure is applied preferably from $9.8 \times 10^4$ to $4.9 \times 10^6$ Pa.

Heat can be applied by a heater built in the printer or separated heater. A heat roller or a heat belt is suitably employed for continuous processing without forming unevenness in small space. It is advantageous to employ a heater for an electrophotographic machine in view of cost saving. Examples include a method to applying heat and or pressure by conveying the recording medium between a heat roller containing heater and a pressure roller, a method to applying heat by conveying the recording medium between a pair of heat rollers, and a method to applying heat by providing a fixing belt between a pair of heat rollers.

The heat roller is composed of a hollow roller and rotate by driving means. A heater such as a halogen lamp heater, a ceramic heater or a nichrome heater is built in. The roller is preferably composed of a material having high heat conductivity such as a metal roller. The surface is preferably coated with fluorine resin to prevent staining. A silicon rubber roller coated with heat durable silicon may be employed.

Driving speed of the recording medium is preferably from 1 to 15 mm/sec when a heat roller is employed. The driving speed mentioned above is advantageous in view of improving image quality in addition to the high speed processing. It is preferable to apply pressure at the same time or just after the heating to obtain high image quality and glossiness. The pressure applied between the rollers is preferably from $9.8 \times 10^4$ to $4.9 \times 10^6$ Pa since the film formation is accelerated.

Figure 2:
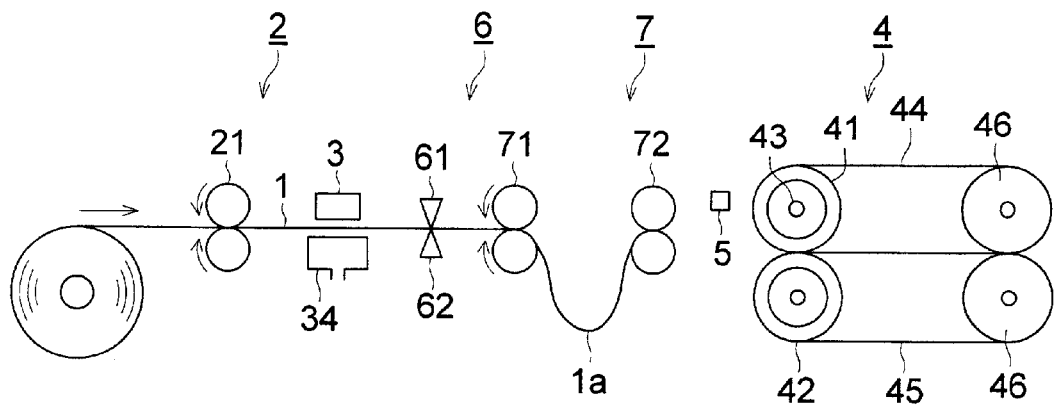
FIG. 2 shows a schematic drawing of an example of the ink-jet recording apparatus having a heating belt usable in the invention.
Figure 3:
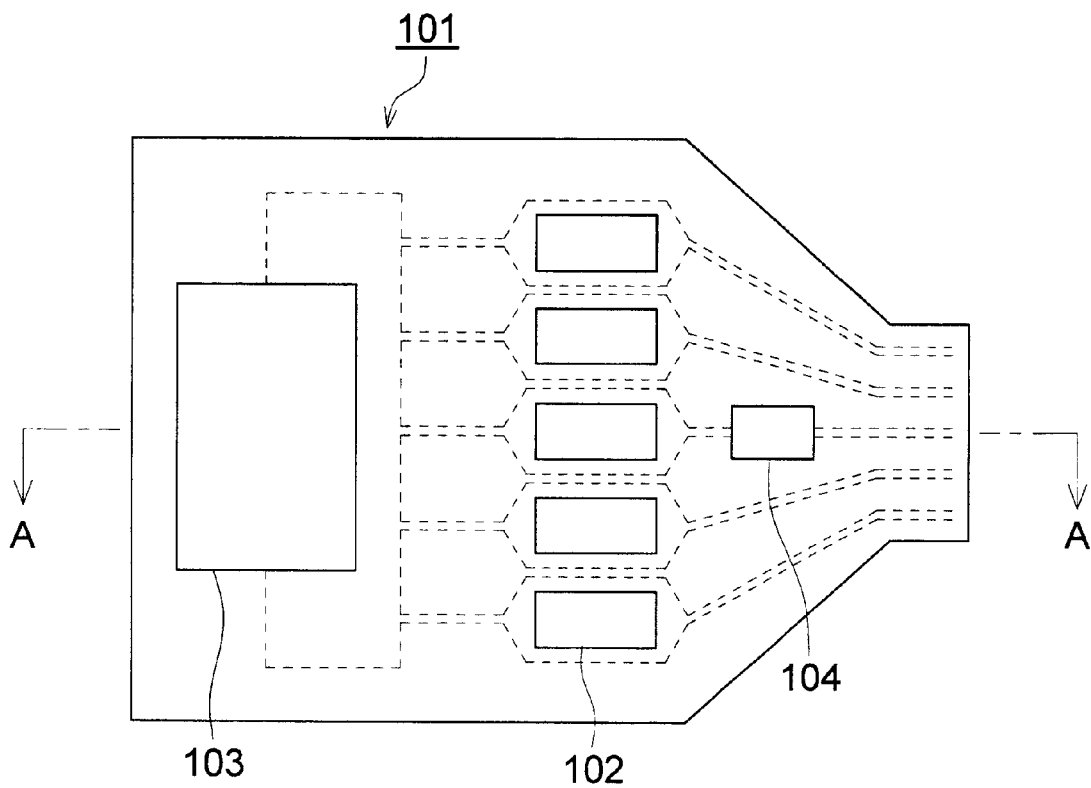
FIG. 3($a$) shows a schematic drawing of an example of the head of the Piezo type ink-jet testing apparatus usable in the invention.
Figure 3:
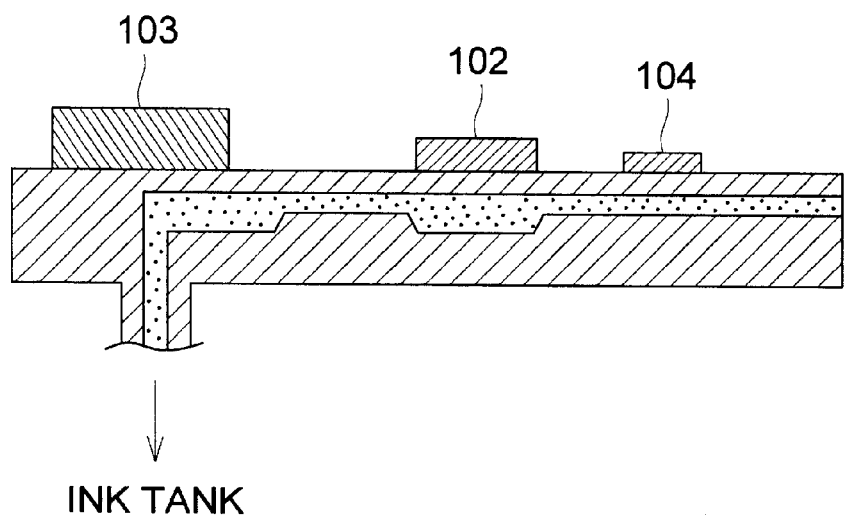

FIG. 1 shows an example of the ink-jet recording apparatus usable in the invention which has the fixing rollers. FIG. 2 shows another example of the ink-jet recording apparatus usable in the invention which has the belt type heat-fixing roller. FIG. 3(*a*) shows a schematic drawing of an example of the head of the Piezo type ink-jet testing apparatus usable in the invention. FIG. 3(*b*) is a cross sectional view of the head along with a line between symbols "A" in FIG. 3(*a*).

The symbols in the drawings are as follows:
1: Recording medium
1*a*: Slacking portion
2: Recording medium conveying means
21: Pair of conveying rollers
3: Recording head
34: Recording medium holding portion
4: Heat and pressure applying means
41: Heating roller
42: Pressing roller
43: Heater
44: Heating belt
45: Lower belt
46: Following moving roller
5: Temperature sensor
6: Recording medium cutting means
61, 62: Cutter
7: Slack forming means
71: First roller pair
72: Second roller pair
101: Head
102: Piezo element
103: Driver IC
104: Thermistor Usually in ink-jet apparatus, a record is formed on a recording medium by an ink droplet which is released and flied from an ink-jet head. The recording methods include a method in which the ink droplet is released while moving the head, primary-scanning, and the recording medium is moved in the direction crossing at right angles with the moving direction of the head, secondary-scanning, and a method in which the head constituted by many nozzles integrated in a line-shape is fixed and the recording medium is moved in the direction crossing at right angles with the line of the nozzles, secondary-scanning.

Figure 4:
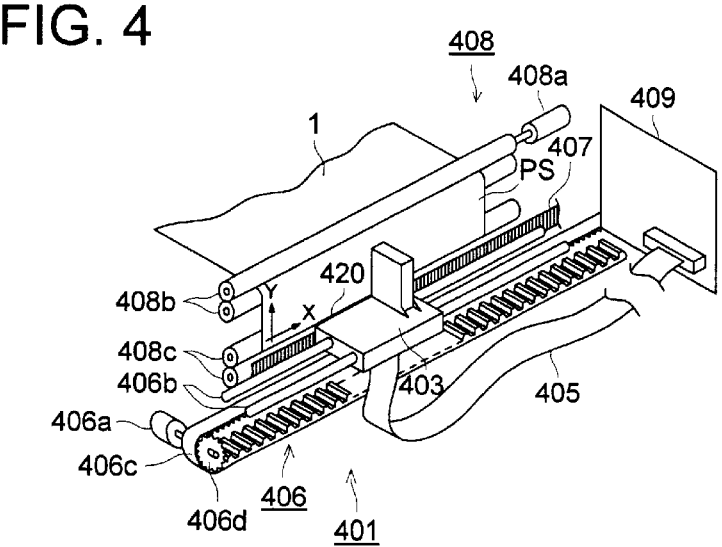
FIG. 4 shows the perspective view of the principal portion of the ink-jet printer.

FIG. 4 shows a perspective view of the principal portion of the ink-jet printer.

In FIG. 4, the carriage 403 is a case for setting the head 420; and the head is connected to a controlling board 409 through a flexible cable 405 taken out from the carriage.

The carriage is repeatedly moved by a carriage driving mechanism 406 in the primary-scanning direction shown by X in the drawing. The carriage driving mechanism includes a motor 406*a*, a pulley 406*b*, a cog belt 406*c* and guide rail 406*d*, and the carriage is fixed to the cog belt.

The carriage fixed to the cog belt is moved in the direction of the arrow X in the drawing at a constant speed when the pulley is rotated by the motor. The guide rail is constituted by two columnar rods provided in parallel with each other, and the rods are passed through holes of the carriage so as to slide the carriage on the rods, and the carriage is moved on a straight line in the back-and-forth direction. The direction of the carriage motion can be changed by reversing the rotation direction of the motor and the moving speed of the carriage can be changed by changing the rotation number of the motor. The carriage has a portion for installing an ink cartridge so that the ink cartridge containing an ink to be released can be put on and taken off.

The flexible cable relates to an image signal transmitting means from the controlling board. The flexible cable is a flexible film on which a wiring pattern is printed and transmits date between the carriage and the controlling board and follows with the motion of the carriage.

An encoder 407 is a transparent resin film on which divisions having a prescribed space are provided; the divisions are detected by a light sensor for measuring the moving speed of the carriage so as to control the speed or the carriage at constant.

A paper conveying mechanism 408 is a mechanism for conveying a recoding paper P in the secondary-scanning direction shown by the arrow X in the figure, which contains a conveying motor 408a, and conveying roller pairs 408b and 408c. The recording medium 1 is held between the pair of the conveying rollers; and the conveying motor is directly connected with the axis of the conveying roller pair 408b. The recording medium 1 is conveyed at a prescribed speed in the secondary-scanning direction shown by the arrow Y shown in the figure by rotating the roller pair 408b. The head 402 installed in the carriage is provided so as to be faced to the surface PS of the recording medium 1 at a position between the roller pair 408a and the roller pair 408c.

An ink releasing mouth is provided on the surface of the head, which is hidden in the figure, faced to the surface PS of the recording medium 1. The ink head is moved accompanied with the motion of the carriage in the direction of the arrow X, and the ink is released on to the recording medium 1 from the releasing mouth according to the signal from the controlling board. At the same time, the recording medium is conveyed in the secondary-scanning direction Thus the image is formed on the recording medium 1.

The image is formed by moving the recording medium 1 at a prescribed speed in the secondary-scanning direction while moving the carriage at the prescribed speed in the primary-scanning direction and releasing the ink onto the recording medium 1.

Figure 5:
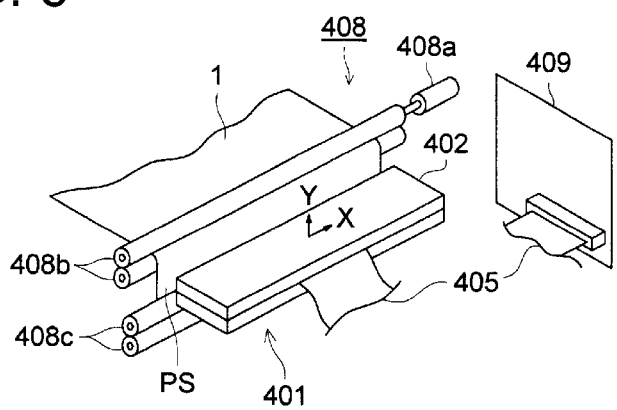
FIG. 5 shows the perspective view of the principal portion of the ink-jet printer using the line head.
Figure 6:
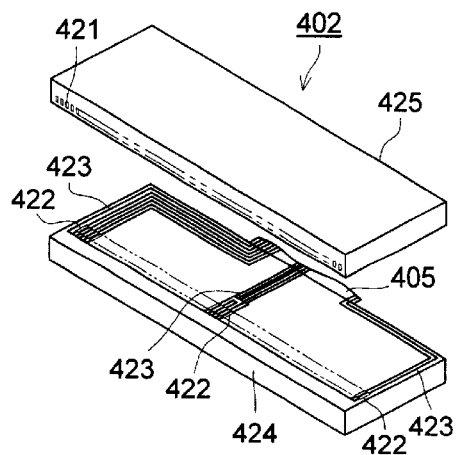
FIG. 6 shows the constitution of the line head.

FIG. 5 shows a perspective view of the principal portion of the ink-jet printer using the line head. FIG. 6 is a drawing for description of the constitution of the line head.

In FIGS. 5 and 6, 402 in FIG. 5 is the line head provided in the ink-jet printer 401; the line head is connected to the controlling board through the flexible cable 405 taken out from the line head. The recording medium 1 is held between the pair of the conveying rollers 408b and 408c; and the conveying motor 408a is directly connected with the axis of the conveying roller pair 408b. The recording medium 1 is conveyed at a prescribed speed in the secondary-scanning direction shown by the arrow Y shown in the figure by rotating the roller pair 408b. The line head is provided so as to be faced to the surface PS of the recording medium 1 at a position between the roller pair 408a and the roller pair 408c. Ink releasing mouths are provided on the surface of the head, which is hidden in the figure, faced to the surface PS of the recording medium 1. The ink for one line is released at once from the releasing mouths according to image signals from the controlling board while moving the recording film in the secondary-scanning direction. Thus the image is formed on the recording medium 1.

The line head 402 shown in FIG. 6 can be separated into a base board 424 and a cover board 425. FIG. 6 shows the interior structure of the line head when the line head is separated into the base board and the cover board. Piezo elements 422 each connected to each of the circuit wires 423 are provided on the base board as shown in the figure, and each of the other terminals of the circuit wire is connected to the flexible wire. On the cover board 425, the ink releasing mouths 421 each forming a pair with each of the piezo elements are arranged as shown in the figure. Each of the ink releasing mouths is connected to a fine tube on which a portion to be receive pressure for releasing the ink is provided. The other end of the tube is connected to an ink tank for supplying the ink which is provided on the cover board; the ink tank is not shown in the figure.

The line head is constituted as above-mentioned. Therefore, image signals from the controlling board are transmitted to each of the piezo elements through the flexible cable and the ink for one line is released from each of the ink releasing mouths at once onto the recording medium 1, thus the image is formed on the recording medium. Another element such as a high voltage method, and a bubble burst method by heat energy may be optionally used even though in the above-described embodiment.

EXAMPLES

Example 1

Preparation of Colored Fine Particle Dispersion

Colored Fine Particle Dispersions 1 through 4 were prepared. An example of the preparation is described below.

Preparation Example 1

Preparation of Colored Fine Particle Dispersion 2

Into a separable flask, 10.0 g of poly(vinyl butyral) BL-S, produced by Sekisui Kagaku Co., Ltd., 10.0 g of Magenta Dye D-2 and 150 g of ethyl acetate were charged, and the air in the flask was replaced by nitrogen gas, and then the contents of the flask were stirred to completely dissolve the poly(vinyl butyral) and the magnet dye. Then 130 g of an aqueous solution containing 15.0 g of sodium dodecylsulfonate was dropped into the flask; and the contents were emulsified for 300 seconds by Clearmix W Motion CLM-08W, manufactured by M Technique Co., Ltd. Thereafter, ethyl acetate was removed under a reduced pressure to obtain a dispersion of core type colored fin particles.

Next, as a shell forming process, the air in the flask containing the foregoing dispersion was replaced by nitrogen gas, and 0.5 g of potassium persulfate was added and dissolved. Then the dispersion was heated at 70° C. by a heater, and reacted for 5 hours while dropping a mixture of 7.5 g of styrene and 2.5 g of 2-hydroxyethyl methacrylate to form shell. Reacted product was purified by an ultrafiltering apparatus to obtain core/shell type Colored Fine Particle Dispersion 2 containing the magenta dye. The average diameter of the colored fine particles contained in Colored Fine Particle Dispersion 2 was 77 nm. The diameter of the particle was a volume average particle diameter measured by a laser particle size analysis system produced by Otsuka Electronics Co., Ltd.

Preparation of the Other Colored Fine Particle Dispersions

The colored fine particle dispersions other than the above-mentioned were prepared using the colorant, the surfactant, the high-boiling organic solvent and the polymer for the shell each shown in Table 1 in the manner similar to the foregoing Preparation Example 1. In Table 1, the adding amount of each of the material is described in percent by weight of the amount of the dye.

TABLE 1

| Colored fine particle dispersion No. | Kind of dye | Polymer of core Kind | Polymer of core Adding amount (weight-%) | Polymer of shell Kind | Polymer of shell Adding amount (weight-%) | Surfactant Kind | Surfactant Adding amount (weight-%) | High-boiling organic solvent Kind | High-boiling organic solvent Adding amount (weight-%) | Remarks |
|---|---|---|---|---|---|---|---|---|---|---|
| 1 | D-1 | P-1 | 44 | — | — | — | — | — | — | *1 |
| 2 | D-2 | P-2 | 100 | P-3 | 100 | SA-1 | 15 | — | — | |
| 3 | D-3 | P-2 | 100 | P-3 | 100 | SA-1 | 15 | — | — | |
| 4 | D-4 | P-4 | 25 | — | — | SA-2 | 94 | S-1 | 73 | *2 |
| | | | | | | | | S-2 | 128 | |

*1 Prepared according to Example 2 described in JP O.P.I. Publication 2001-11347
*2 Prepared according to Example 1 described in JP O.P.I. Publication 2001-335734

D-1: Mixture of A and B in ratio of 2:1

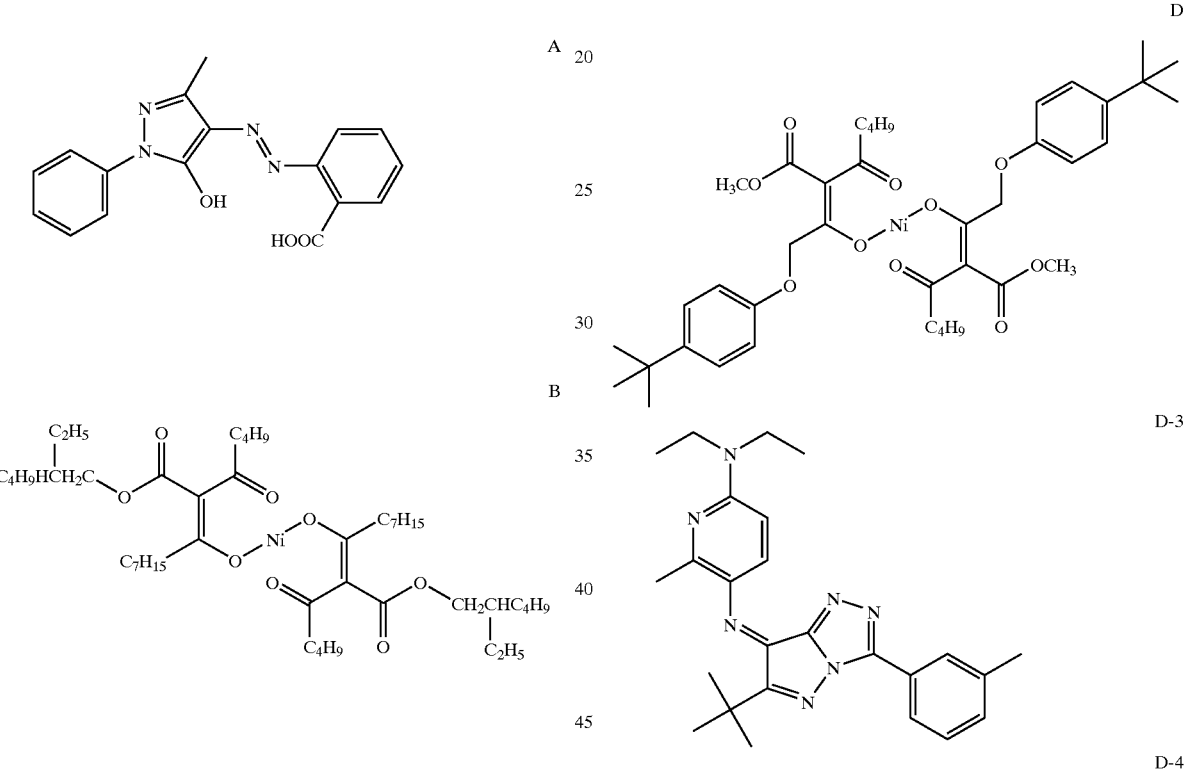

D-2: Mixture of C and D in a ratio of 1:1

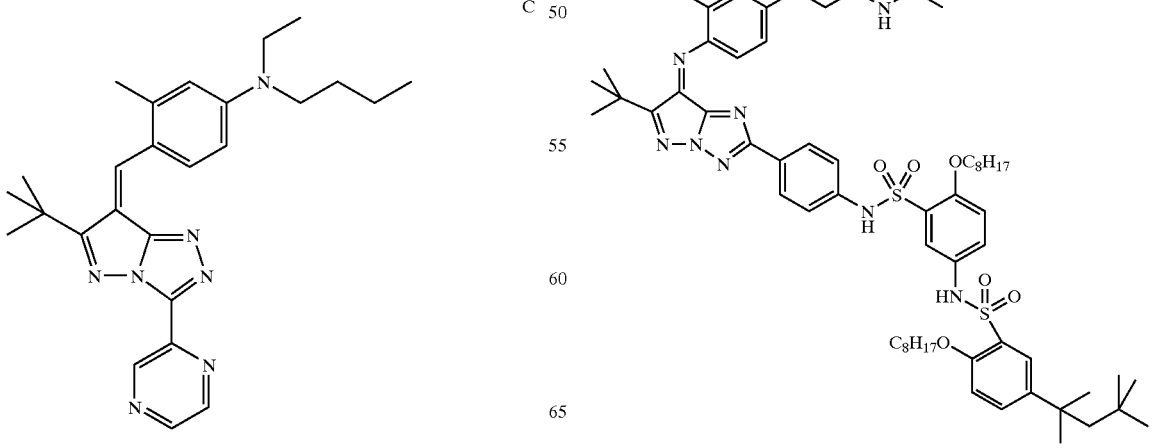

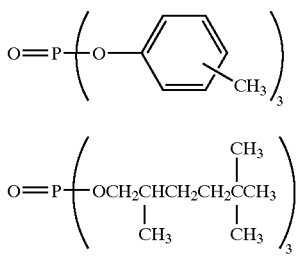

The detail of the abbreviations of the compounds shown in Table 1 is as follows:

P-1: Copolymer of methyl methacrylate/n-butyl acrylate/acrylic acid in a monomer molar ratio of 47.5/47.5/5.0. The polymer was neutralized by a 1 mole/liter solution of sodium hydrogen carbonate.

P-2: Poly(vinyl butyral) BL-S produced by Sekisui Kagaku Co., Ltd.

P-3: Copolymer of styrene/2-hydroxyethyl methacrylate in a monomer molar ratio of 75/25

P-4: Poly(n-butyl methacrylate)

SA-1: Sodium dodecylsulfonate

SA-2: Pelex OP, anionic surfactant produced by Kao Co., Ltd.

Preparation of Ink

Inks 101 through 104 were prepared each using the above-prepared colored fine particle dispersions, respectively. For preparing the inks, purified water, the solvent and the surfactant described in Table 2 were added to each of the colored fine particle dispersions so that the concentrations of the ingredients were made to those described in Table 2. The amount of each of the colored fine particle dispersions was optionally controlled so that the concentration of the colorant in the ink was 3%. When the colorant concentration in the dispersion is insufficient so that the concentration of the colorant in the ink cannot be adjusted to 3%, the colored fine particle dispersion was concentrated by removing water under a reduced pressure.

The properties of each of the ink and those of the particle in the ink were measured by the following methods with respect to each of the above-prepared inks. Measurement of average particle diameter of the colored fine particles Each of the inks was diluted by 1,000 times and the volume average particle diameter was measured by Zetasizer 1000 manufactured by Malvern Ltd.

TABLE 2

| Ink No. | Dispersion No. | Solvent Kind | Solvent Adding amount (weight-%) | Surfactant Kind | Surfactant Adding amount (weight-%) | Colored fine particle content (weight-%) | Average particle diameter (nm) |
|---|---|---|---|---|---|---|---|
| 101 | 1 | DEG | 10 | — | — | 5.1 | 83 |
| 102 | 2 | EG/gly | 10/20 | SA-3 | 2.0 | 9.0 | 77 |
| 103 | 3 | EG/PG/TEGBE | 15/15/3 | SA-3 | 1.0 | 9.0 | 76 |
| 104 | 4 | DEG/Urea/gly | 11/4.6/5 | SA-3 | 0.55 | 9.8 | 42 |

The detail of the abbreviations of the compounds shown in table 2 is as follows:

DEG: Diethylene glycol

Gly: Glycerol

TEGBE: Triethylene glycol monobutyl ether

EG: Ethylene glycol

PG: Propylene glycol

SA-3: Olfin E1010, nonionic surfactant produced by Nissin Chemical Industry Co., Ltd.

Image Formation and Evaluation

An image was printed out on Konica Photo Jet Paper Photolike QP glossy paper by an ink-jet test printing apparatus having two Piezo type ink heads each having 128 nozzles with a nozzle diameter of 20 μm and a releasing frequency of 30 kH. The image was constituted by a wedge image in which the density of from 0% to 100% was separated into 16 steps of patch-like image of 3 cm×3 cm. The printed images were subjected to the following evaluation.

Ink images 201 to 212 were printed out by controlling the nozzle driving condition, the ink jet head driving condition and the feeding condition of the recording medium, the amount of released ink droplet and the recording density in the primary- and secondary-scanning directions as shown in Table 3.

The Piezo type ink-jet test printing apparatus was constituted as shown in FIG. 3(a). The cross section by A—A line of the head 101 is shown in FIG. 3(b).

The ink-head having 128 nozzles was used even though a head 101 having 5 releasing nozzles is shown in FIG. 3(a) for explanation. On the head, a piezo element 102 for releasing the ink droplet by motion of the element is provided corresponding to each of the nozzles. A driver IC 103 supplying driving signals and heating signals to the piezo element is provided on the flowing course of ink or the ink accumulating portion. A thermistor 104 is provided on the releasing nozzle as the temperature measuring means.

Evaluation of Glossiness

The glossiness was evaluated with respect to the wedge image having a reflective density of approximately 1.0. The glossiness of each of the samples was visually evaluated by 20 usual persons and classified according to the following norm.

A: 16 or more persons judged that the glossiness is sufficient.

B: 12 to 15 persons judged that the glossiness is sufficient.

C: 8 to 11 persons judged that the glossiness is sufficient.

D: 7 or less persons judged that the glossiness is sufficient.

The glossiness classified into ranks A and B is preferably accepted for practical use.

Evaluation of Friction Resistively

The friction resistively was evaluated using the highest density output area of the wedge image. The reduction of the density of the image when the image was rubbed 10 times by an eraser MONO produced by Tombow Pencil Co., Ltd., was visually observed.

4: Reduction of the density of the image is not recognized; the dregs of the eraser are not colored.

3: Reduction of the density of the image is not recognized; the dregs of the eraser are colored.

2: A little reduction of the density of the image is recognized; the dregs of the eraser are colored.

1: Reduction of the density of the image is apparently recognized.

The friction resistivity classified into the ranks 3 and 4 is preferably accepted for practical use.

Evaluation of Smoothness

The smoothness were visually evaluated at the image area and the non-image area and classified according to the following norm.

A: The smoothness of the image area is excellent; the difference of the smoothness between the image area and the non-image area is not felt at all.

B: The smoothness of the image area is good; the difference of the smoothness between the image area and the non-image area is not felt.

C: The smoothness of the image area is inferior a little: the difference of the smoothness between the image area and the non-image area can be felt.

D: The smoothness is not felt at the image area; the difference of the smoothness between the image area and the non-image area is notable.

Thus obtained results are shown in Table 3.

TABLE 3

| Ink image No. | Ink No. | Proper releasing amount of liquid | Recording density (dpi*) Primary scanning direction (**) | Recording density (dpi*) Secondary scanning direction (***) | w value | Evaluation result Glossiness | Evaluation result Friction resistively | Evaluation result Smoothness | Remarks |
|---|---|---|---|---|---|---|---|---|---|
| 201 | 101 | 10 | 720 | 720 | 7.3 | D | 2 | C | Comp. |
| 202 | 102 | 10 | 720 | 720 | 4.0 | C | 1 | C | Comp. |
| 203 | 103 | 10 | 720 | 720 | 3.2 | D | 1 | D | Comp. |
| 204 | 104 | 6 | 1440 | 720 | 1.6 | C | 1 | C | Comp. |
| 205 | 101 | 4 | 720 | 720 | 18.3 | B | 3 | A | Inv. |
| 206 | 101 | 10 | 1080 | 1080 | 16.3 | B | 3 | B | Inv. |
| 207 | 101 | 6 | 1440 | 720 | 24.2 | A | 4 | B | Inv. |
| 208 | 101 | 4 | 1200 | 1200 | 50.5 | A | 3 | B | Inv. |
| 209 | 102 | 4 | 1440 | 720 | 19.8 | B | 3 | A | Inv. |
| 210 | 103 | 8 | 1440 | 1440 | 15.8 | B | 3 | B | Inv. |
| 211 | 103 | 2 | 2880 | 1440 | 126.4 | A | 4 | A | Inv. |
| 212 | 104 | 2 | 2880 | 1440 | 19.6 | B | 4 | B | Inv. |

Comp.: Comparative
Inv.: Inventive
*dpi is the number of dot per 2.54 cm
(**) Direction perpendicular to the moving direction of the recording medium.
(**) Moving direction of the recording medium.

As is shown in Table 3, it is confirmed that the images formed by the image recording method according to the conditions defined in the invention are superior in the glossiness and the smoothness, and have sufficient resistively against rubbing by the eraser. In contrast, the images formed by the comparative methods are inferior in the glossiness, the smoothness and the friction resistively.

The ink-jet image forming methods can be provided by the invention, which gives an image improved in the glossiness, the friction resistively and the smoothness.

What is claimed is:

1. An ink-jet image recording method comprising jetting ink droplet onto a recording medium while the recording medium moves by employing an aqueous ink containing a colored particles comprising a colorant and a resin, wherein the ink is satisfies the following Formula 1;

$$15 \leq w \leq 150 \qquad \text{Formula 1}$$

wherein, w is a parameter expressed by following Formula 2;

$$w=[(dm+ds)/\{(NV \times vd)/r^3\}] \times 10,000 \qquad \text{Formula 2}$$

wherein, ds is a recording density in dpi in a moving direction of the recording medium and dm is a recording density in dpi in a direction perpendicular to the moving direction of the recording medium, NV is the colored particle content in the ink in weight percent, vd is a volume average radius in meter of the colored particles and r is radius in meter of the ink droplet.

2. The ink-jet image recording method of claim 1, wherein w is from 20 to 130.

3. The ink-jet image recording method of claim 1, wherein the colorant is an oil-soluble dye.

4. The ink-jet image recording method of claim 1, wherein a set of two or more aqueous inks having different colorant density of the same color is employed.

5. The ink-jet image recording method of claim 4, wherein a set of two or more aqueous magenta inks having different colorant density and a set of two or more aqueous cyan inks having different colorant density are employed.

6. The ink-jet image recording method of claim 4, wherein the set of aqueous inks contains a high colorant density aqueous ink and a low colorant density aqueous ink.

7. The ink-jet image recording method of claim 6, wherein (colorant density of the low colorant density ink)/(colorant density of high colorant density ink) is from 0.1 to 1.0.

8. The ink-jet image recording method of claim 7, wherein (colorant density of the low colorant density ink)/(colorant density of high colorant density ink) is from 0.2 to 0.5.

9. The ink-jet image recording method of claim 8, wherein (colorant density of the low colorant density ink)/(colorant density of high colorant density ink) is from 0.25 to 0.4.

10. The ink-jet image recording method of claim 1, wherein the resin is polyvinyl alcohol.

11. The ink-jet image recording method of claim 1, wherein the volume average radius of the colored particles is from 5 to 100 nm.

* * * * *

UNITED STATES PATENT AND TRADEMARK OFFICE
CERTIFICATE OF CORRECTION

PATENT NO. : 6,746,115 B2
DATED : June 8, 2004
INVENTOR(S) : Tomotake et al.

It is certified that error appears in the above-identified patent and that said Letters Patent is hereby corrected as shown below:

<u>Column 26,</u>
Line 4, cancel " $w=[(dm+ds)/\{(NV \times vd)/r^2\}] \times 10,000$  Formula 2 "

insert -- $w=[(dn+ds)/\{(NV \times vd)/r^3\}] \times 10,000$  Formula 2 --

Signed and Sealed this

Seventh Day of September, 2004

JON W. DUDAS
*Director of the United States Patent and Trademark Office*